W. E. WILLIAMS.
METHOD OF PREPARING BASES FOR RUBBER TIRES AND OTHER PURPOSES.
APPLICATION FILED JAN. 14, 1920.
1,412,326. Patented Apr. 11, 1922.
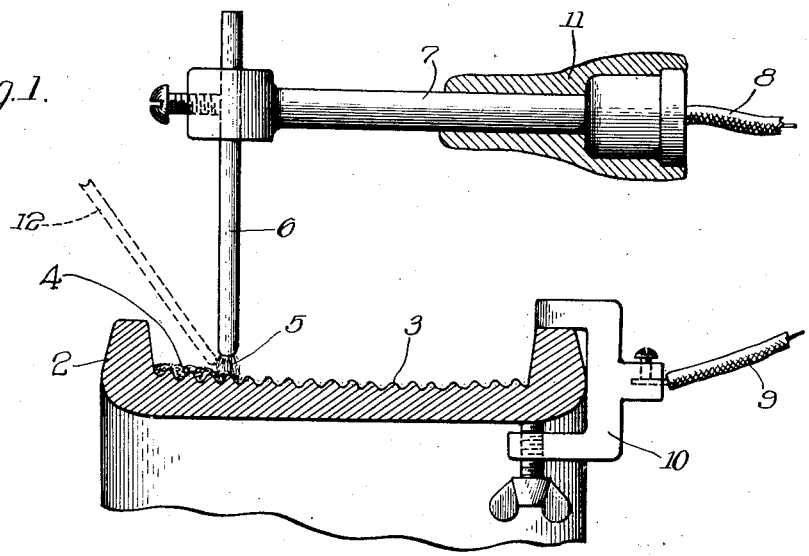
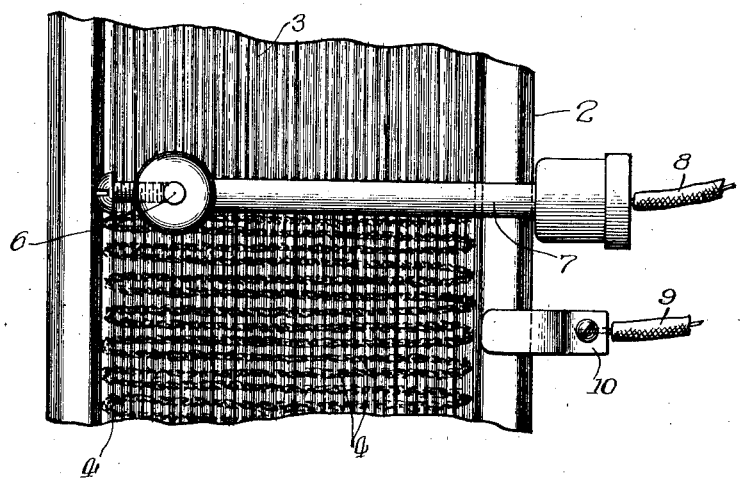
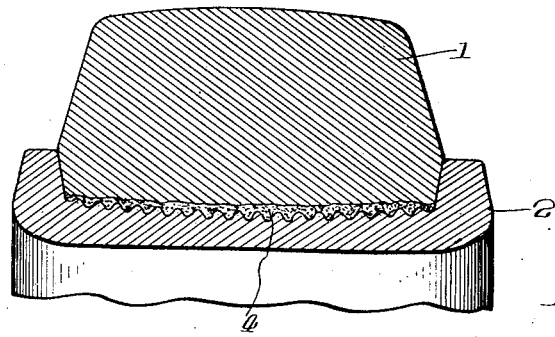
Witness:
B. J. Bernhard
Inventor:
W. E. Williams

UNITED STATES PATENT OFFICE.

WILLIAM ERASTUS WILLIAMS, OF CHICAGO, ILLINOIS.

METHOD OF PREPARING BASES FOR RUBBER TIRES AND OTHER PURPOSES.

1,412,326.     Specification of Letters Patent.     Patented Apr. 11, 1922.

Application filed January 14, 1920. Serial No. 351,285.

*To all whom it may concern:*

Be it known that I, WILLIAM ERASTUS WILLIAMS, a citizen of the United States, a resident of Chicago, in the county of Cook and State of Illinois, have invented a new and useful Improvement in Methods of Preparing Bases for Rubber Tires and other Purposes, of which the following is a specification.

The invention relates to a system of facing a metal or other base with another metal or material which will provide additional mechanical adhering features as well as chemical features, in a manner to facilitate the union of rubber or other suitable material with the base.

The object of the invention is to coat the material of a base with a different material better suited for holding rubber mechanically or in some cases by the aid also of chemical action.

Reference will be had to the accompanying drawing, in which Figure 1 is a cross section of a rubber tire base in connection with one means of preparing the surface in accordance with my invention.

Figure 2 is a plan of the parts shown in Figure 1.

Figure 3 is a transverse section through a solid rubber tire and its metal base, after the rubber has been vulcanized to the base.

In the drawing 1 indicates the solid rubber tire and 2 the metal base. It is the custom to roll, or otherwise prepare, a metal base for a solid rubber tire with the corrugations or indentations as indicated by 3. These corrugations or indentations are circumferential and vary in shape according to the desire of the maker, and they may be hot rolled in the forming of the base or they may be machined and handled as may be desired by the maker.

I prefer to prepare the corrugations hot rolled and then clean the surface by pickling, but the pickling may be dispensed with if desired.

The surface or base having these usual corrugations has added a series of transverse ribs or ridges, of different metal, preferably formed by using as an electrode a rod 6 of the metal selected, and by means of a holder 7, having insulation at 11, moving it, while a powerful current is passing through the rod and base 2, back and forth from side to side of the corrugated surface, whereby the metal of the rod is progressively fused, carried across the arc gap at 5, and integrally united with the metal of the base which is itself momentarily fused along the path of the electrode's advance, circuit from a suitable source of electrical energy (not indicated) being made through conductors 8, 9, leading, respectively, to the rod 6 and a conducting clamp 10, engaging the base 2, although in practice the custom in doing work of this kind is to support the tire base ring on rollers that are connected to the electrodes 9 which facilitate the handling of the work.

It is substantially immaterial as to what point on the metal base 2 this connection of the electrode 9 is made.

The rapidity with which the metal from the rod 6 may be deposited upon the metal base 2 is to a wide extent controlled by the character of the electric current which is carried through the arc 5.

I prefer to use as the depositing metal, as indicated by the rod 6, cast iron or some other material which has a high factor of adhesion to rubber or rubber to it, when the rubber is vulcanized thereto and in this respect cast iron is superior to the rolled metal necessarily used in making tire bases.

However, the work of the class herein shown, required to be more or less uniformly done with duplicate pieces, may be carried on by a tool which is automatically handled by machinery and not necessarily required to be controlled by the hand of the operator.

While I prefer the electric arc for fusing and depositing the metal from the pencil or rod 6 upon the tire base, I may use any other desirable system for this purpose, for example, a gas method of fusing the rod 6 and impinging it by blast upon the surfaces desired to be coated in a manner heretofore used in other relations.

It is desirable in securing the rubber to a metal base, in the case of a wheel, to have transverse ridges or indentations, as well as circumferential ones, inasmuch as the torque of a wheel serves to shove the rubber endwise or circumferentially and these transverse ridges which I put into my tire base are highly desirable in resisting the torque strains on the connection of the rubber with the metal.

Metal deposited as I have shown and described, may be of a highly porous character, which facilitates the mechanical intermingling and union of the particles of rubber with the metal and facilitates the juncture of the two materials.

Cast iron is a more desirable metal for securing to rubber than is the rolled steel necessarily employed as tire bases and I may use whatever metal or material is found most efficient by putting it into the form of my rod 6, or in place of the rod 6 I may use a carbon rod and introduce the material into the arc in the form of a rod 12 shown in dotted lines. In place of this rod 12 being a solid rod it may be a tube through which a powder or other material may be transmitted into the arc, or other heating means whereby the coating material is secured to the base.

I may, if desired, use an ordinary gas flame, instead of my rod 6 and arc 5, for the purpose of heating a track or region on the tire base and at the same time injecting into this track or region the material for the coating, which material, as I before stated, may be metal or other desirable material.

In place of vulcanizing the rubber to the base after the same is prepared by my method, I may fix the rubber thereto by any suitable intermediate adhesive, which will have a binding effect between the two surfaces, which binding effect will be assisted by the coating as I have above described.

This same feature of depositing a material upon a base to which rubber is to be attached, may be used when a nonmetallic body is desired for the base, but in this instance the temperature of the arc or the gas flame employed must not be transmitted to the base sufficiently to endanger the base by too high a temperature.

This may be brought about by using the gas or blast method of depositing, which method is more or less well known, and consists in driving fused metal against a surface, to be coated, by means of a blast of air or other gas.

In preparing my rod 6, or the substitute therefore, I prefer to use an iron high in sulphur.

When sulphur is used as the coating and rubber is the material to be applied to the base, the vulcanization of the rubber will serve to harden that particular zone of the rubber immediately under the influence of the sulphur coating on the base, depending somewhat on the general nature of the mixture of the rubber compound used.

What I claim is:—

1. The method of preparing a base for the attachment of rubber which consists in depositing fused material upon the base while the latter is heated at the place of deposition.

2. The method of preparing a base for receiving rubber which consists in depositing upon a heated portion of the base a fused material better adapted than the material of the base for securely holding rubber vulcanized upon it.

3. The method of preparing a rolled metal base for receiving and securely holding rubber, which consists in permanently uniting cast iron with the rubber-receiving face of the base.

4. The method of preparing a non-cast metallic base for securely holding rubber placed thereon, which consists in integrally uniting with the base, by fusion, rubber-receiving cast iron.

5. The method of preparing a base for securely holding rubber vulcanized thereon which consists in depositing as ribs upon the rubber receiving surface of the base material more porous than the material of the base.

6. The method of preparing a wheel rim for securely holding a rubber tire, which consists in forming upon the rim, by fusion, salient material more porous than the rim material, and in position to receive rubber to be vulcanized in place.

7. The method of preparing a wheel rim for securely holding a rubber tire, which consists in providing the tire-receiving surface with a series of transversely extending ridges more porous than the rim itself.

8. The method of preparing a base for securely holding rubber vulcanized thereon, which consists in fusing upon and integrally uniting with the base material disposed in ridges transverse to the direction of expected strains tending to produce relative displacement.

Signed at Chicago, in the county of Cook and State of Illinois, this tenth day of January, 1920.

WILLIAM ERASTUS WILLIAMS.

Witnesses:
B. J. BERNHARD,
F. M. ZOBEL.